United States Patent [19]

Lukas

[11] 3,920,911

[45] Nov. 18, 1975

[54] HOTEL PBX ELECTRONIC MESSAGE BILLING ARRANGEMENT

[75] Inventor: Frederic Lukas, Lancaster, Calif.

[73] Assignee: Bell Telephone Laboratories, Incorporated, Murray Hill, N.J.

[22] Filed: July 5, 1974

[21] Appl. No.: 486,002

[52] U.S. Cl. ........................ 179/7.1 TP; 179/7 MM

[51] Int. Cl.[2] ........................................ H04M 15/10

[58] Field of Search...179/7 R, 7 MM, 7.1 R, 7.1 TP, 179/9, 8 R

[56] References Cited

UNITED STATES PATENTS

| | | | |
|---|---|---|---|
| 3,651,269 | 3/1972 | Le Strat et al. | 179/7 R |
| 3,657,482 | 4/1972 | Dal Monte | 179/7 MM |
| 3,697,695 | 10/1972 | Pommerening | 179/7 MM |
| 3,748,392 | 7/1973 | Henquet et al. | 179/7 MM |

*Primary Examiner*—Kathleen H. Claffy
*Assistant Examiner*—Gerald L. Brigance
*Attorney, Agent, or Firm*—H. R. Popper

[57] ABSTRACT

An arrangement for electronically recording and displaying charges for calls made from station lines of a hotel or motel PBX is disclosed which eliminates the use of the prior art banks of electromechanical message registers. An electronic memory unit is accessed when a call is made and the number of the calling station is entered into a trunk memory word. When the central office sends message charging pulses to the PBX, the trunk word is accessed and the station number is read out. The station number then addresses the memory and the message count accruing in a memory byte assigned to the station word is incremented. Thereafter, the hotel clerk by dialing a prefix code and the station line number may obtain a display of the message count accruing for the station; the system generates a pseudo trunk number and is thereby able to re-use most of the same memory access and output register circuitry that was used to store the line number and to increment the message count.

15 Claims, 14 Drawing Figures

MESSAGE COUNT DETECTOR SCANNER CIRCUIT

FIG. 8 COUNTER & SCANNER ADDRESS REGISTER CIRCUIT

FIG. 9 TRANSLATOR ADDRESS REGISTER

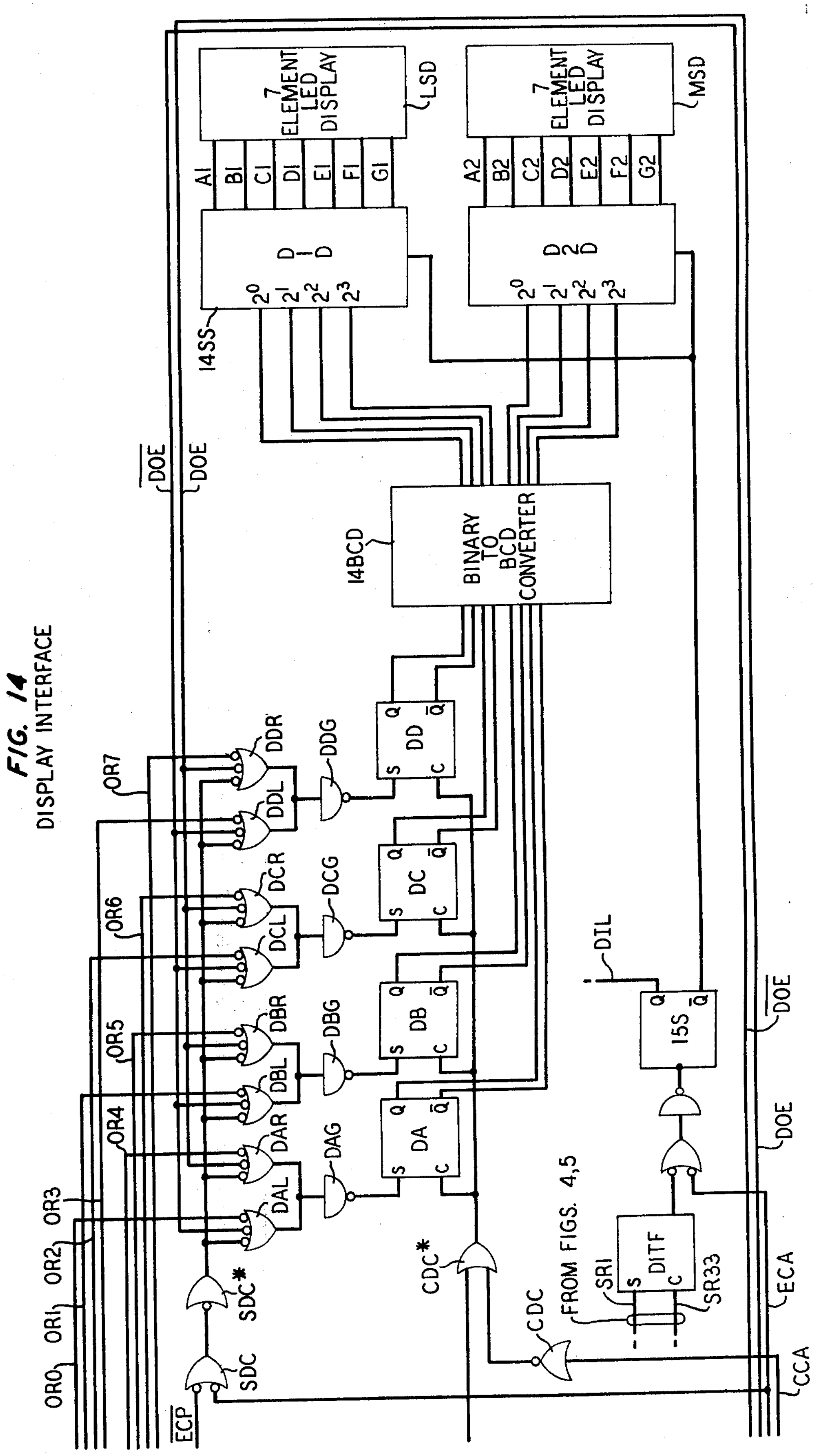
FIG. 14 DISPLAY INTERFACE

HOTEL PBX ELECTRONIC MESSAGE BILLING ARRANGEMENT

This invention relates to message billing in private branch exchanges. For many years private branch exchanges such as the types installed in hotels and motels have employed electromechanical message registers on a per station line basis. This message register usually occupied a position adjacent to the quarters of the hotel billing clerk and it is the general practice for the billing clerk to consult a guest's message register at check-out in order to render the client a bill for telephone calls made during his stay.

The prior art electromechanical message register was connected to the station line circuit and adapted so as to be able to receive a message charging pulse that was transmitted from the remote central office and which arrived at the PBX over the central office trunk being used on the billable call.

It has, of course, been realized for some time that the electromechanical message register arrays required a great deal of room on the customer's premises and it would be desirable to provide a more compact method of customer charge indication. From the standpoint of telephone system maintenance it must be appreciated that a conventional electromechanical message register required for its operation a large amplitude current pulse to be transmitted over the central office trunk. Lines carrying heavy current pulses required special precautions to avoid excessive interference with voice paths and are otherwise undesirable.

Accordingly, it is an object of the present invention to eliminate the need for electromechanical message registers in switching exchanges particularly of the PBX hotel/motel type.

In accordance with the principles of the present invention in one illustrative embodiment thereof, an electronic ferreed is provided in which a memory word is allocated for each central office trunk and each station line served by the PBX. Incident to the establishment of a connection between a station line and an outgoing central office trunk, the common control of the PBX—which advantageously may be any of the prior art common control PBXs such as that shown in Anderson et al., U.S. Pat. No. 3,612,767 issued Oct. 12, 1971 or any of the 756, 757 or 770 Crossbar PBXs, the 812 Crossbar-with-electronic-control PBX or the 801A ferred PBX manufactured by the Western Electric Company, will contain both the identity of the calling station line and of the outgoing central office trunk seized for use on the call. During one cycle of the operation of the apparatus of the inventiion the calling station line and trunk numbers are received from the common control and the line number of the line to which the trunk has been assigned for use on the call is stored in the memory word allocated to the trunk.

Further in accordance with the invention, each central office trunk is equipped with a flip-flop which is adapted to be set upon the receipt by the trunk of a message billing pulse from the remote central office. Advantageously, this flip-flop can be set with a much lower amplitude pulse then has heretofore been required by the conventional electromechanical message register. Additionally, such flip-flops are required only on the basis of one per trunk rather than prior art message registers which were required on the basis of one per station line.

After the cycle in which the station number has been entered into the memory word of the trunk seized for use on the call, the trunk flip-flops are scanned and the detection of a set flip-flop, indicating a trunk which has received a message billing impulse since the last scanning cycle, results in the trunk word for that trunk being accessed to obtain the identity of the station line number stored therein. The station line number is then employed to access the station line memory word allocated to the station. The station line memory word contains a count of the message units chargeable to the station line. The count is read out, incremented, and returned to the station memory word.

According to the invention therefore a count is kept in electronic memory of the message units billable to a station line without the use of an electromechanical message register.

Further in accordancae with the invention, however, the attendant or hotel clerk may access the station line memory unit by dialing the number of the station line. Normally, such access will result in the non-destructive display of the information contained in the station line memory word for the station number dialed. However, at the completion of the guest's stay at the hotel, a special prefix code may be dialed which resets the station line memory word to zero.

In order to make the changeover from electromechanical to electronic message registration attractive to telephone customers, it is important to reduce as much as possible the cost of the necessary equipment provided this can be done without sacrificing reliability of performance. In accordance with an aspect of the invention, economy of circuitry is achieved in part by reutilizing some of the same circuitry for different functions. For example, it is one feature of the invention that substantially the same apparatus accesses the line status store word. After obtaining that word from the trunk status store incident to updating, the message count is also employed when the hotel billing clerk desires to read out the line status store word for a particular line. In this case, however, the predetermination of the trunk memory word is made automatically and directly by the central control without, of course, the need to hunt for an idle trunk. By thus employing one spare word in the trunk memory, it is not necessary to employ separate accessing circuitry for the line status store on this type of call.

BRIEF DESCRIPTION OF THE DRAWINGS

The invention will be more readily understood from the following detailed description, taken in conjunction with the accompanying drawings, in which:

FIG. 14 shows the display interface circuitry.

GENERAL DESCRIPTION

Figure 1:
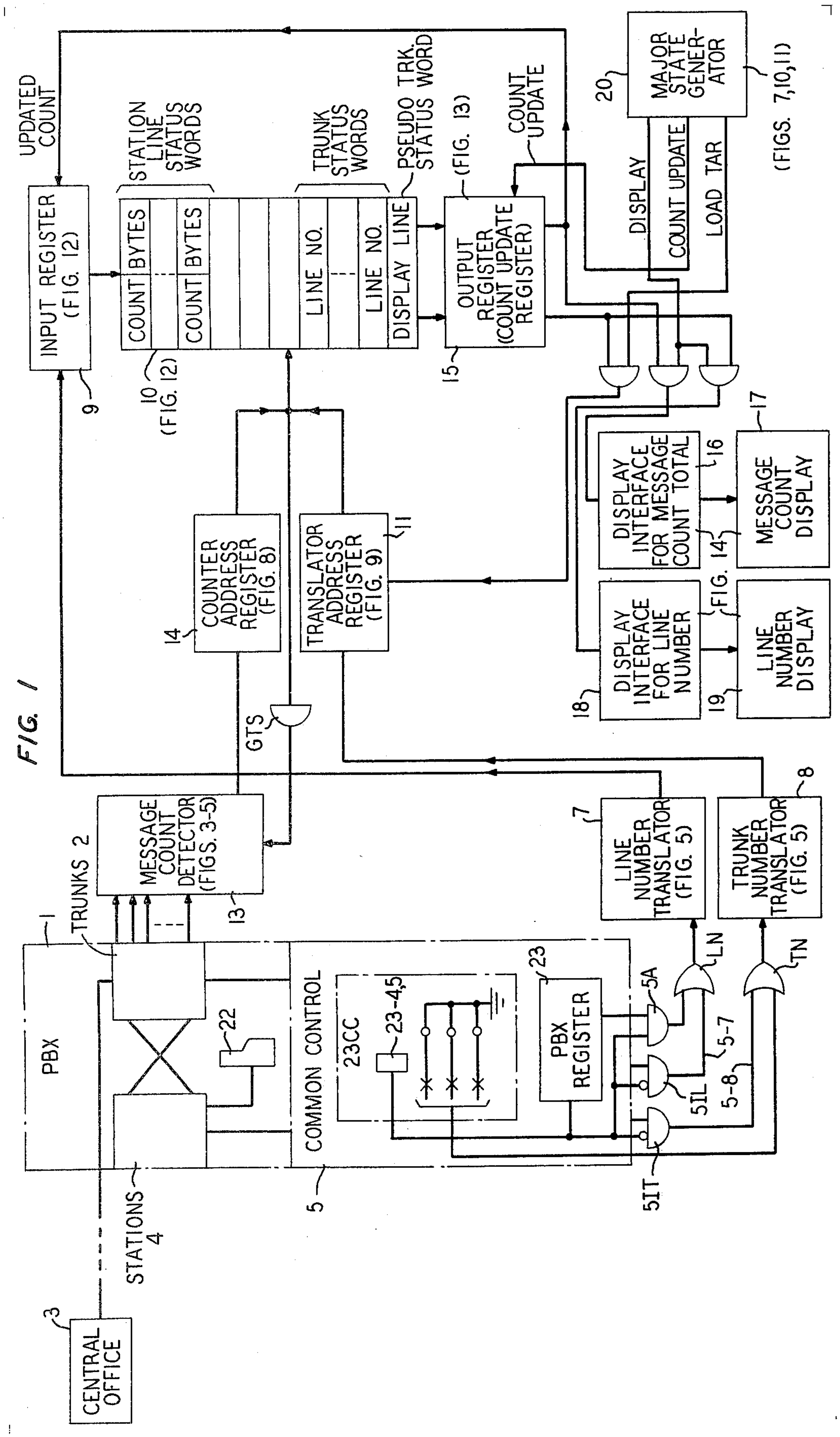
FIG. 1 is a block diagram of the electronic message registration system of the present invention.
Figure 2:
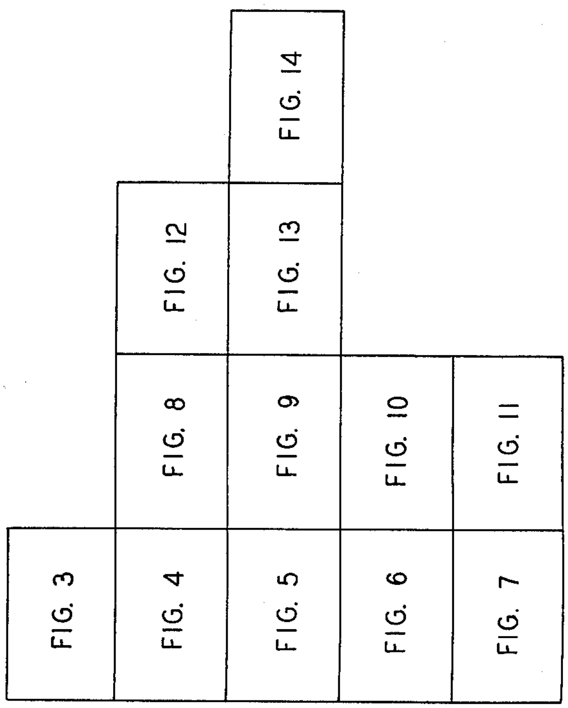
FIG. 2 shows how FIGS. 3 through 13 ought to be arranged.

Referring now to FIG. 1, there is shown a block diagram of the major components of the invention. A conventional common control PBX 1 is shown having a plurality of trunks 2 connected with a remote central office 3. During the setup of an outgoing telephone call from any one of the PBX stations 4, common control 5 selects an idle one of trunks 2 and is informed of the number of the calling station and of the idle trunk so selected. Equipments 1, 2, 3, 4, and 5 so far discussed are all well known in the prior art and are illustrated in such conventional systems as the 756, 757, and 812A PBX systems manufactured by the Western Electric Company.

The number of the calling station line is entered into line number translator 7 via cable 5–7 inhibit gate 5IL and OR gate LN. Inhibit gate 5IL in cable 5–7 is normally not inhibited. The number of the one of central office trunks 2 assigned to the calling station on the call is entered into trunk number translator 8 via cable 5–8, inhibit gate 5IT, and OR gate TN. Inhibit gate 5IT is normally not inhibited. Advantageously, the registration in translators 7 and 8 may take place during what is known conventionally as the "call back connection" sequence of operation of common control 5. The numbers registered in translators 7 and 8 will be provided by common control in any one of the coding formats such as 2 out of 5 or 2 out of 7, etc. conventionally used in common control telephone systems and translators 7 and 8 convert these into binary code format which is conveniently usable for addressing of and storage in electronic memory 10. The line number in translator 7 is furnished to input register 9 of electronic memory 10 at approximately the same time that the trunk number in trunk number translator 8 is entered into translator address register (TAR) 11. Under the control of major state generator 20 the trunk number in TAR 11 addresses memory 10 to a corresponding word location and the contents of input register 9 is written into that memory word.

At the conclusion of the memory entry cycle, the system of the invention enters the scanning and message count update cycle in which message count detector 13 scans flip-flops (see FIGS. 4, 5) associated with trunks 2 to detect whether any trunk has received a message billing signal from central office 3. While message count detector 13 is scanning, counter 14 is incremented to the addresses of the trunk status words in memory 10. When detector circuit 13 detects a set trunk flip-flop, counter address register 14 under the control of major state generator 20 addresses the corresponding trunk status word in memory 10 allocated to the trunk. The trunk status word contains the number of the one of stations 4 that is using the detected trunk for the central office call. Also under control of state generator 20, the station number read out of the trunk word in memory 10 is transferred from output register 15 to translator address register TAR 11.

Translator address register TAR 11 thereupon accesses the station line status byte allocated to the station line and this byte, which contains the message count that has been accrued for the station line, is read out to output register 15. Normally the message count will be the total billable message units for the customer who has been occupying the room corresponding to the station line. At this time the count update lead (LCU or RCU, FIG. 13) of output register 15 is enabled by major state generator MSG 20 FIG. 11 to increment the message count in output register 15. Input register 9 is then cleared and the augmented count in register 15 is transferred to input register 9 and rewritten into the station line status byte thus completing the message count update cycle MCDU of the invention.

Further in accordance with the invention, the contents of the station line status words may be selectively displayed in display unit 17 with the corresponding station line number being displayed in display 19. The hotel billing clerk using attendant telephone set 22 dials the line number of the station line whose message count is to be read out accompanied by a predetermined prefix digit.

The registration of the prefix digit in PBX register 23 activates pseudo trunk number generator 23CC and inhibits inhibit gates 5IL and 5IT. Advantageously, the pseudo trunk number may be a pre-wired pattern of energized conductors 23CC that are connected by contacts of relay 23–4,5. The registration of the prefix digit in register 23 also enables AND gate 5A to enter the subsequently-dialed line number into line number translator 7 via the upper input cable of OR gate LN.

Translator 8 converts the pseudo trunk number into binary format by means of which translator address register TAR 11 can address a predetermined word location in memory 10. At the same time, gate GTS detects the appearance of the pseudo trunk address at the output of translator 11 and sets a special flip-flop in messagae count detector 13. The remaining digits of the number that has been dialed by the billing clerk at telephone set 22 are translated by translator 7 and are entered into input register 9.

From this point on, the numbers in input register 9 and TAR 11 are employed to access and write into memory 10 in the same manner as memory 10 was accessed and written into incident to the previously described memory entry cycle.

It will be recalled that after the conclusion of the usual memory entry cycle message count detector 13 scans trunks 2 to detect a set flip-flop. If any flip-flops corresponding to trunks 2 have been set these will be detected and, in addition, detector 13 will detect the special flip-flop corresponding to the pseudo trunk. When the special flip flop corresponding to the pseudo trunk is detected, counter address register 14 under control of master state generator 20 address the allocated pseudo trunk status word in memory 10. The contents of this memory word is the number of the line whose count is desired to be displayed. This line number is entered into output register 15 and transferred to translator address register 11 and under control of master state generator 20 memory 10 thereupon accesses the station line status byte for the pertinent line. Simultaneously, the line number is furnished to display interface 18. The message count accruing in the station line status byte is read out to output register 15 under control of generator 20 and transferred to display interface circuit 16 for display in the message count display 17 at the same time that the line number is displayed by line number display 19.

DETAILED DESCRIPTION

Figure 4:
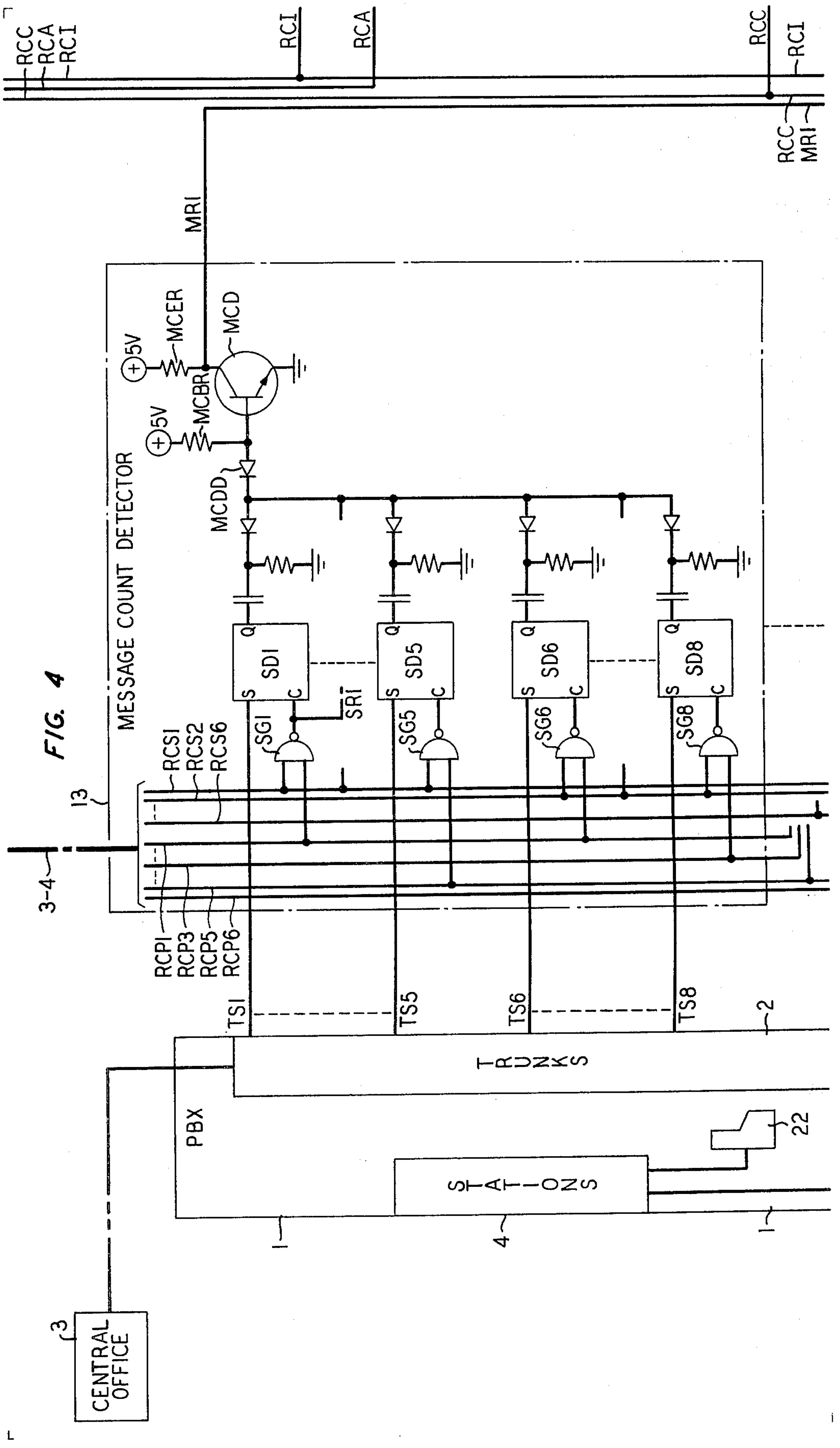
FIGS. 4 and 5 show the modified PBX, the message count detectors and the line and trunk number translators.
Figure 5:
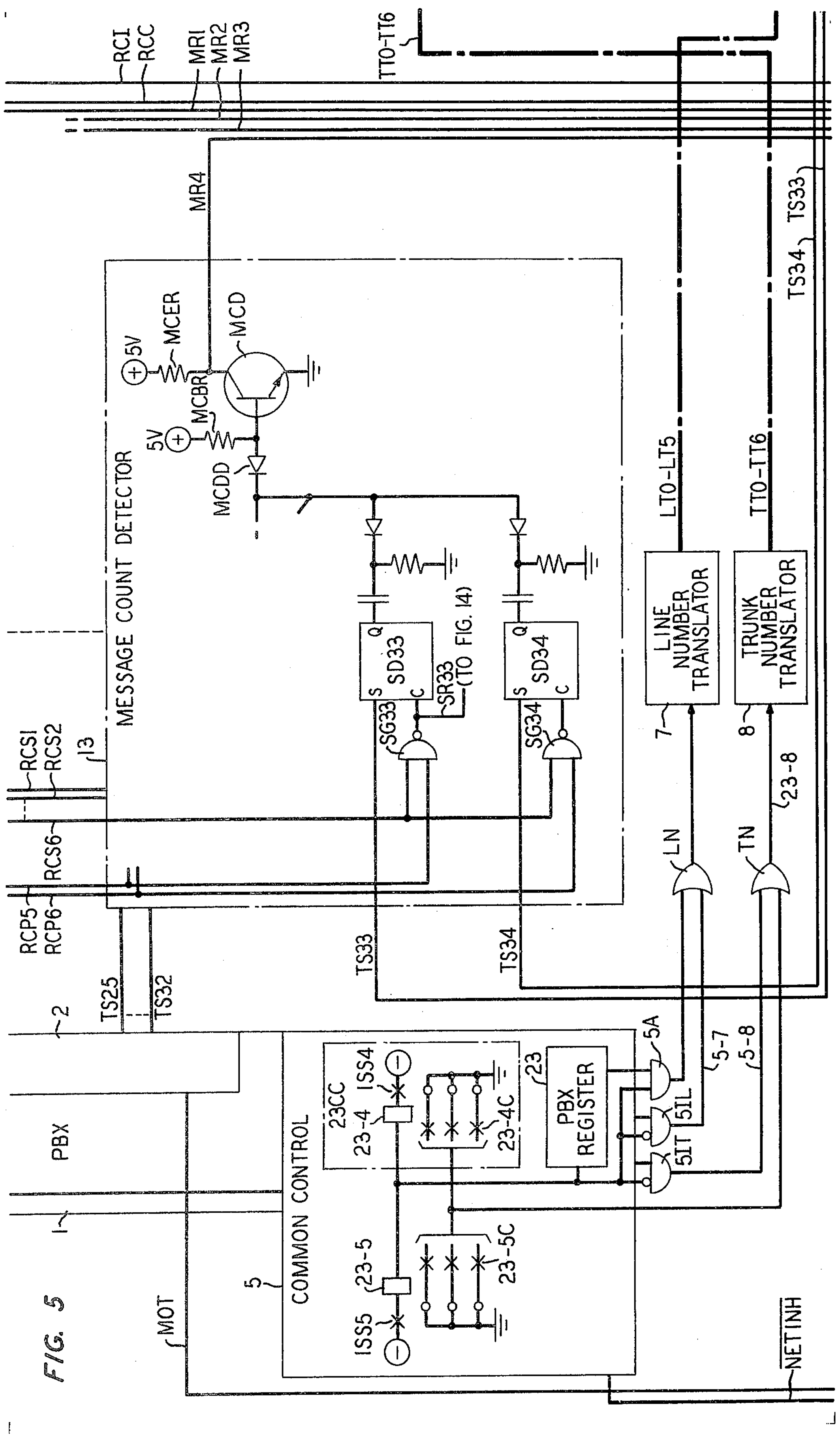

Referring now to FIGS. 4 and 5, the PBX of FIG. 1 has been redrawn in somewhat greater detail with the same reference numerals applied to show the nature of the modifications to its common control 5. When the PBX is seized for use in setting up a call, its common control applies a low signal to lead $\overline{NETINH}$. This lead may be energized by any convenient prior art relay in the common control unit which is operated when a connection is to be established between one of stations 4 and one of trunks 2. The application of the low signal on lead $\overline{NETINH}$ enables NOR gate $\overline{NAWM}$ in FIG. 7. The upper input of NOR gate NAWM is normally maintained in the high signal condition by the battery supply associated with the internal output transistor (not shown) of NOR gate AAE of FIG. 5. When any of trunks 2 in FIGS. 4 or 5 is seized, the PBX applies a high signal on lead MOT. The high signal on lead MOT is applied to the input of NOR gate AWM in FIG. 7, the output of which triggers the upper input of NOR gate NAWM low. At this time both inputs of gate NAWM are in the low signal state causing its output to go high. This output is inverted by inverter NAWI and applied to the set input of 1.6 millisecond monopulser AWMMM. After 1.6 milliseconds, output $\bar{Q}$ of monopulser AWMM goes low and a low signal is applied to the upper input of NOR gate EAW. Timing and control circuit gate EOC, FIG. 10, applies a low signal to the lower input of NOR gate EAW at the end of the counting cycle, hereinafter to be described, controlled by battery counters CC1 through CC3 of FIG. 7. With low signals at both of its inputs gate EAW applies a high signal to lead TRE. The high signal on lead TRE forces the output of NOR gate MCD to the low signal condition which is effective to trigger 10 microsecond monopulser MCDM. After 10 microseconds, the Q output of monopulser MCDM goes high setting flip-flop CSL. The setting of flip-flop CSL causes its $\bar{Q}$ output to apply a low signal to NAND gate CG of clock circuit RCC. The low signal forces the output of gate CG to the high signal state irrespective of the signal that is applied to the lower input of gate CG. Prior to the application of the low signal to the upper input of gate CG, the $\bar{Q}$ output of flip-flop CSL was in the high signal state allowing gate CG to respond to signals applied at its lower input. As will hereinafter be explained, the RCC clock which includes gate CG, 10 microsecond delay circuit CD and 10 microsecond monopulser CF includes an internal feedback path that connects the two delay circuits in a regenerative loop so that a series of 10 microsecond square wave pulses are normally applied to output lead RCC. Accordingly, the setting of flip-flop CSL which blocks gate CG effectively stops the RCC clock. When the RCC clock is stopped, output lead RCC remains in the high signal condition (flip-flop CF reset).

In addition to stopping the RCC clock, the high signal on lead TRE is applied through two inverters to set the 1 millisecond monopulser TLM which maintains a high signal at its Q output and a low signal at its $\bar{Q}$ output for 1 millisecond. The inverted Q output of TLM sets the 50-microsecond monopulser WTCM which applies 50-microsecond high and low signals at its Q and $\bar{Q}$ output. The $\bar{Q}$ output of monopulser WTCM is applied to lead WTC which forces the output of NOR gate WE in FIG. 11 to the high signal state. The high signal at the output of NOR gate WE is applied to the memory unit of FIG. 12 as a write enabled signal.

It will be recalled that the PBX of FIGS. 4 and 5 was assumed to have been seized for use on the call by one of stations 4 that employed one of trunks 2. Incident to the operation of the PBX, the numbers of the calling line and of the selected trunk are ascertained as is known in the prior art. These numbers are entered respectively into line number translator 7 and trunks number translator 8, FIG. 5, and the number of the trunk over which the call is forwarded is entered into the trunk number translator 8. The contents of line number translator 7 is entered into input register 9 of FIG. 12. The translators 7 and 8 convert line and trunk numbers from the form in which these numbers may be represented in the PBX (2-out-of-5 code, binary coded decimal, etc.) to binary format. Such translators are well known and need not be detailed herein. Translataors 7 and 8 may, of course, be dispensed with if the PBX itself actually identifies line and trunk numbers in binary format. When the write enable lead is activated, the contents of input register 9 is stored in memory unit 10 at the memory address determined by the number registered in translator address register 11. Simultaneously, the contents of trunk number translator 8 is entered into translator address register 11, FIG. 9, setting flip-flops TA0 through TA6 in accordance with the binary representation of the trunk number. Accordingly, when the write enable gate WE is activated, the number of the station line making the call is entered into memory unit 10 of FIG. 12 at the address assigned to the trunk selected for use by the call.

Figure 7:
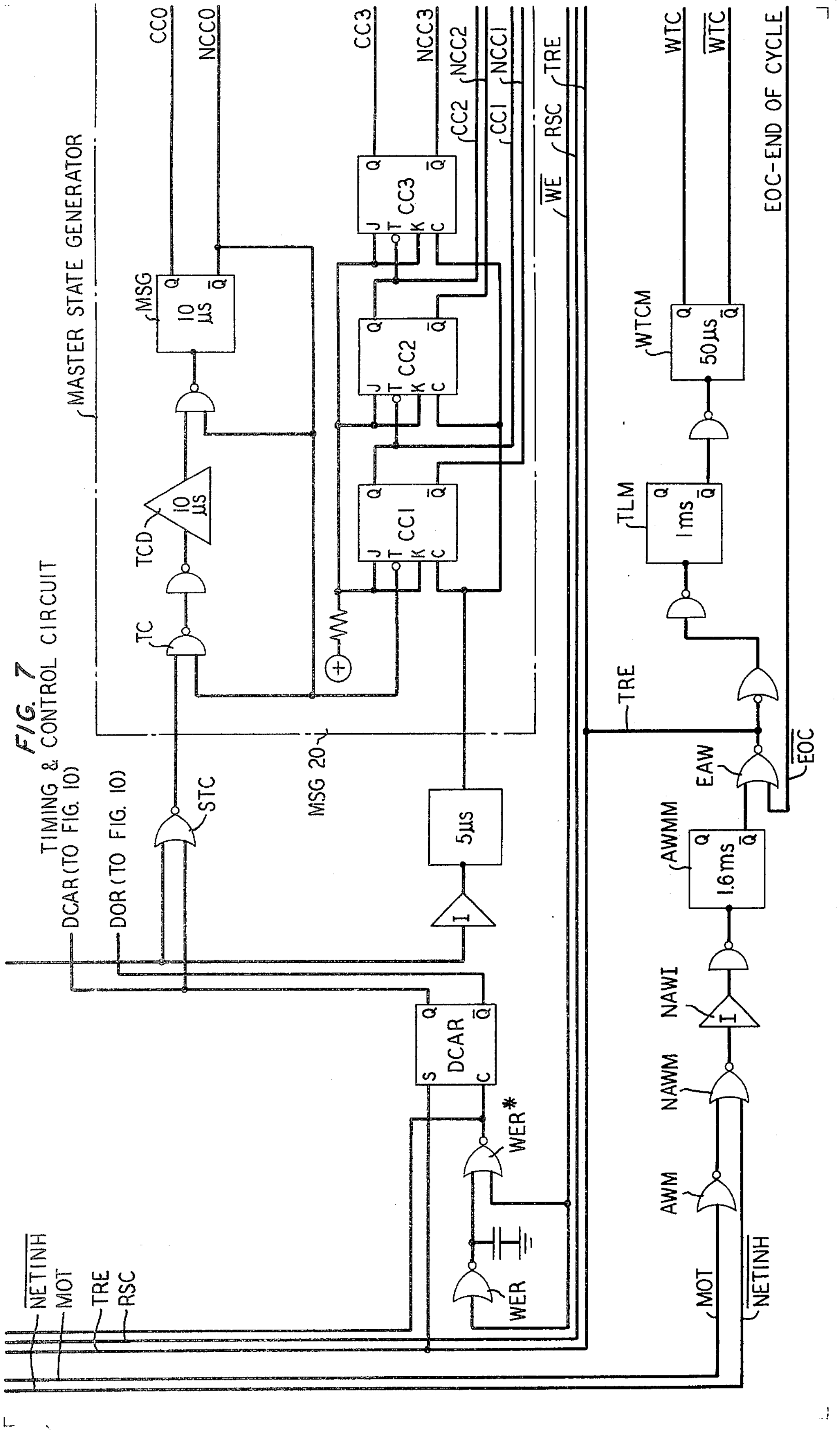
FIGS. 7, 10 and 11 show the master state generator circuits.
Figure 10:
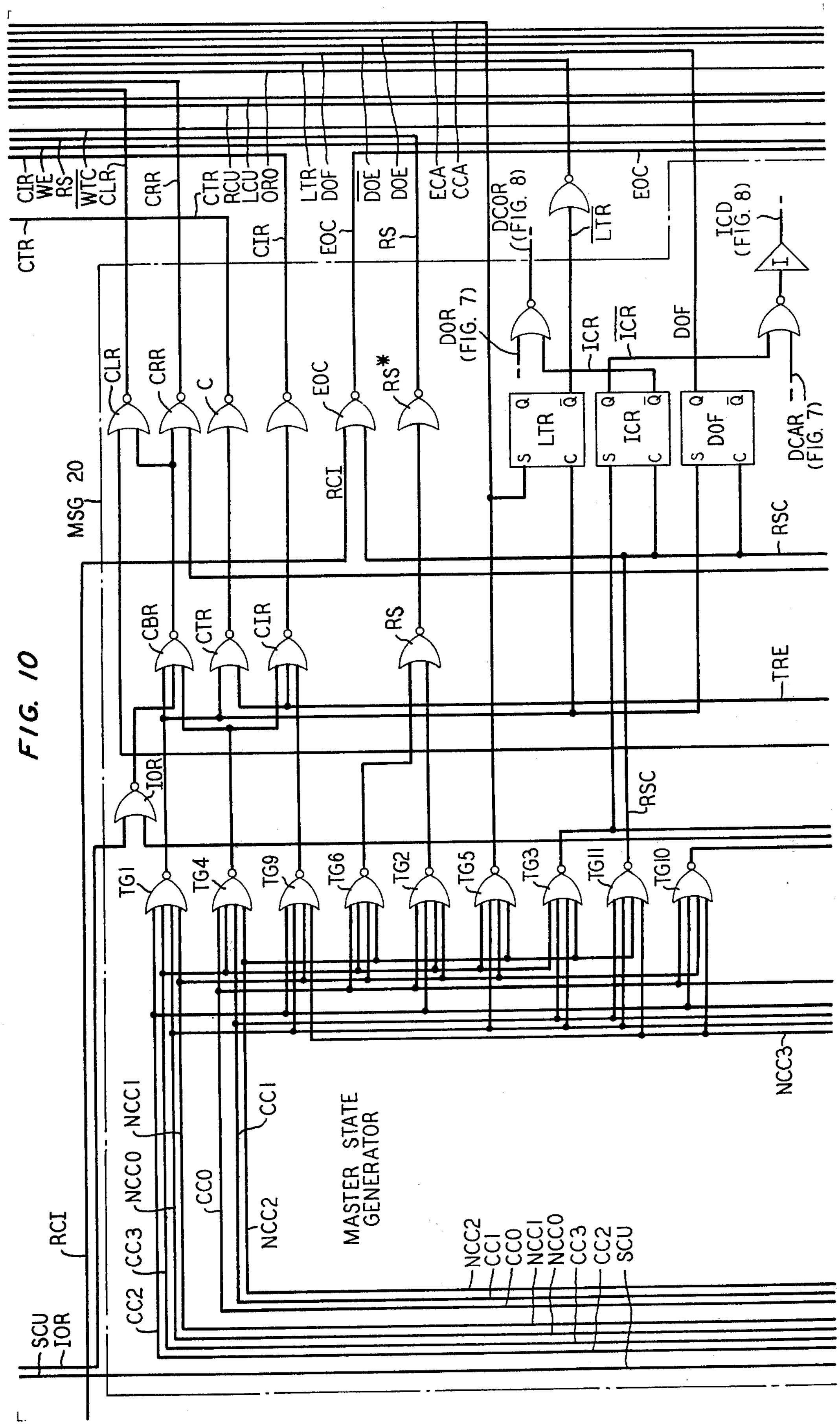
Figure 11:
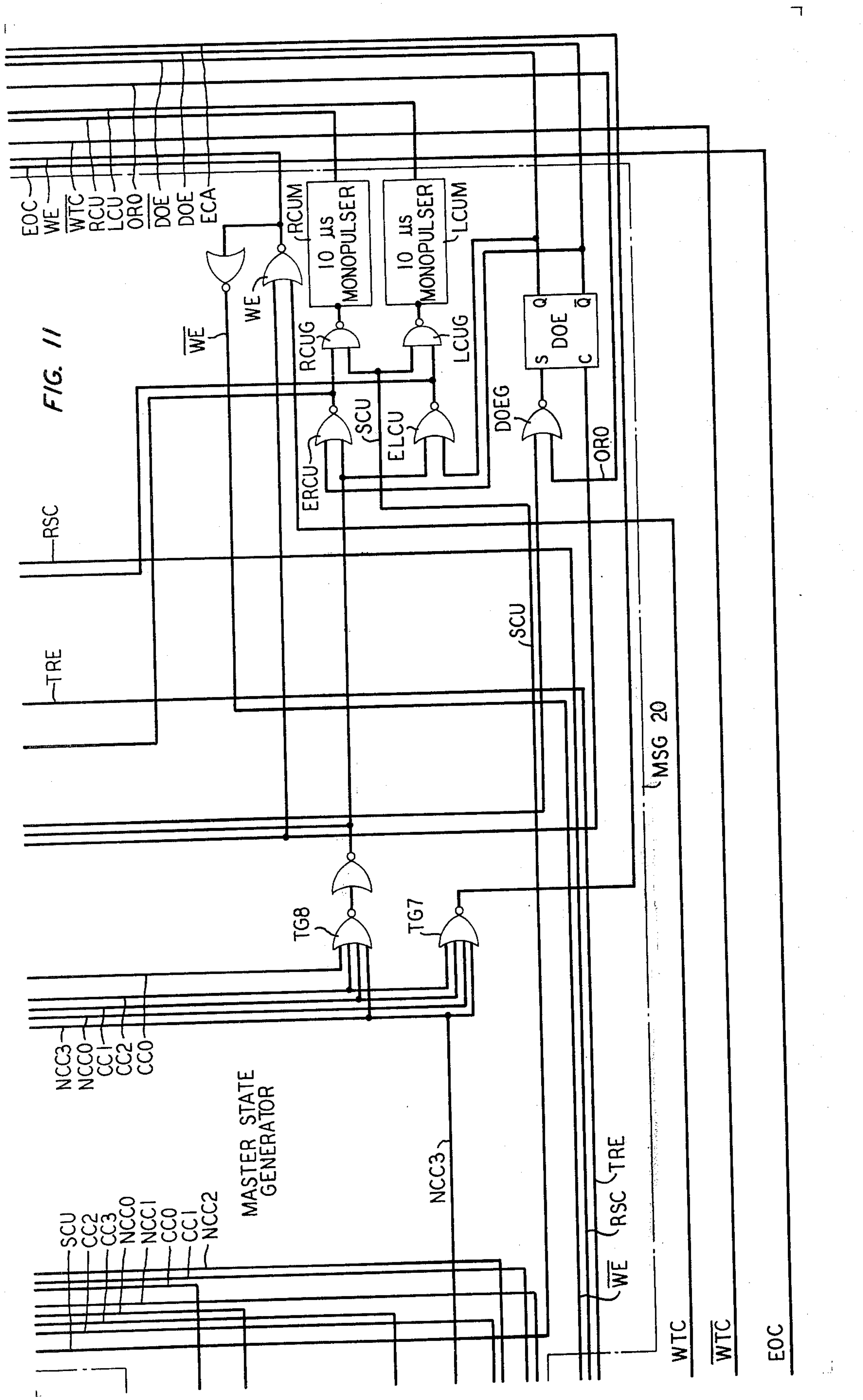

At the same time that the output of NOR gate WE delivers the write enable signal to memory unit 10, gate WER* in FIG. 7 is enabled and places a low signal at the clear input of flip-flop DCAR and the lower input of NOR gate RSL. The upper input of NOR gate RSL is also in the low signal condition. Since, as will hereafter be explained, the timing and control circuit gate TG11, FIG. 10, produces a low signal on lead RSC during the end-of-cycle interval which is assumed to be in effect at present, the low signal at the output of gate RSL, inverted, clears flip-flop CSL. The clearing of flip-flop CSL, at its $\bar{Q}$ output produces a high signal at the upper input of NOR gate STC forcing its output low. Since flip-flop DCAR is reset, its high output applies a low signal to the lower input of NOR gate STC. When clock MSG was stopped, its output lead MCCO was placed in the high signal condition and therefore a high signal was maintained at the lower input of NAND gate TCG. The resetting of flip-flop DCAR and the clearing of flip-flop CSL cause NOR gate STC to apply a high signal to the upper input of NAND gate TCG which is enabled to apply a low signal at its output to the 10 microsecond delay flop TCD whose output goes low after a 10 microsecond delay and triggers 10 microsecond monopulser MSG. The setting of monopulser MSG causes a 10 microsecond high signal to appear on lead CCO and a 10 microsecond low signal to appear on lead NCCO. The low signal appearing on lead NCCO toggles flip-flop CC1 starting a sequence of counting operations which successively enable gates TG1 to TG11 of FIGS. 10 and 11. The Q output of flip-flop CC1 is applied to gates TG4, TG3, and TG11 of FIG. 10 and to gates TG8 and TG7 of FIG. 11. Flip-flop CC1 through CC3 and NOR gates TRG1 through TG11 are interconnected to form a modified version of a gray code counter. As is well known, a gray code counter when incremented changes a binary value on each incremental count. The arrangement of FIGS. 7, 10, and 11 is such that the signal state of only two of gates TG0 through TG11 is interchanged each time flip-flops CC1 through CC3 are toggled, with but two exceptions. A table showing the pattern of energization of gates TG1 through TG11 as flip-flops CC1 through CC3 are toggled appears below

TABLE I

| | CC3 | $\overline{CC3}$ | CC2 | $\overline{CC2}$ | CC1 | $\overline{CC1}$ | CC0 | $\overline{CC0}$ |
|---|---|---|---|---|---|---|---|---|
| TG1 | x | | x | | | x | | x |
| TG2 | x | | x | | | x | x | |
| TG3 | x | | | x | x | | | x |
| TG4 | x | | | x | x | | x | |
| TG5 | x | | | x | | x | | x |
| TG6 | x | | | x | | x | x | |
| TG7 | | x | x | | x | | | x |
| TG8 | | x | x | | x | | x | |
| TG9 | | x | x | | | x | | x |
| TG10 | | x | x | | | x | x | |
| TG11 | | x | | x | x | | | x |

The principal functions performed by the master state generator MSG 20 may be described in terms of the timing gates TG1 through TG11 of FIGS. 10 and 11 as set forth in the following table:

TABLE II

Figure 9:
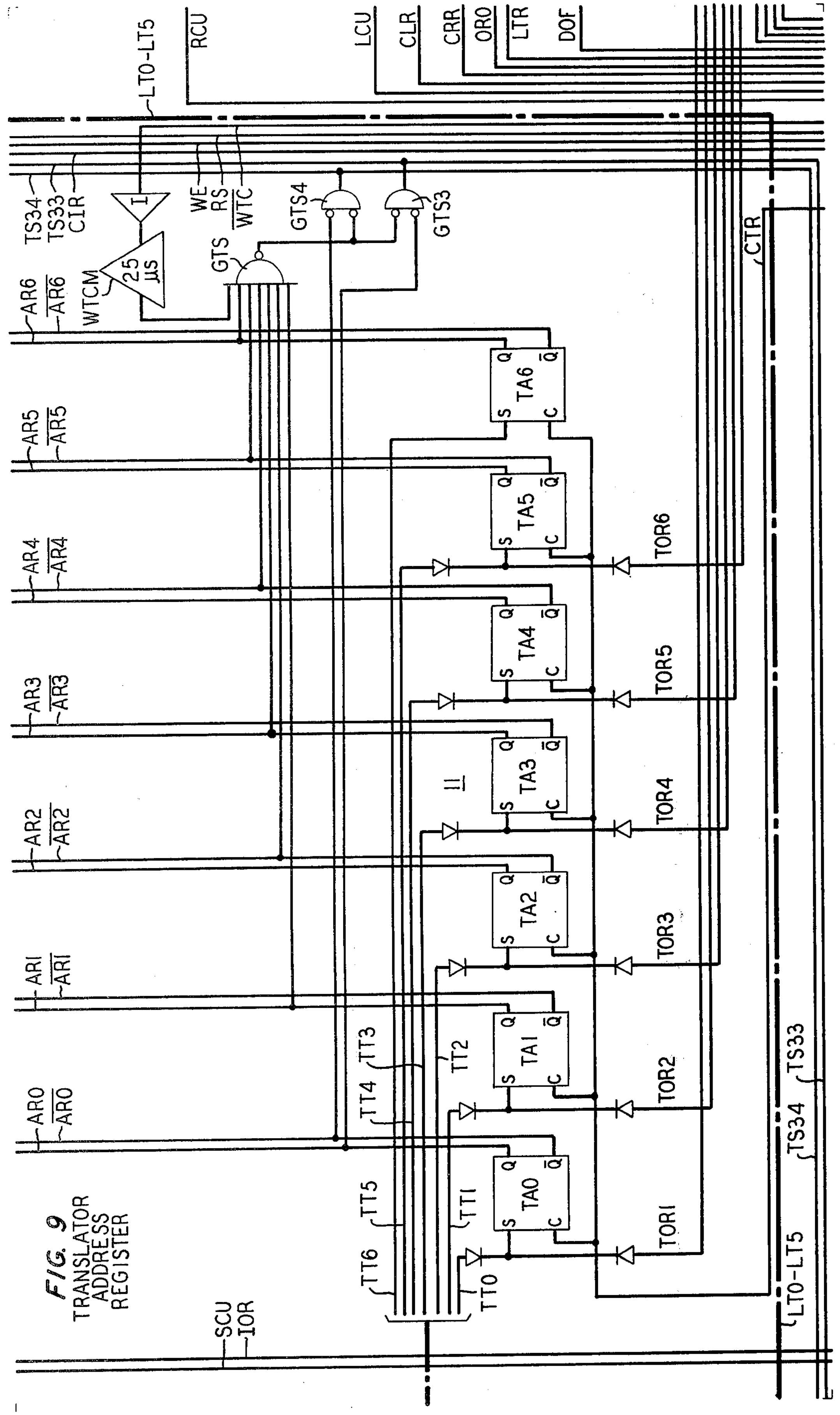
FIG. 9 shows the translator address register.
Figure 12:
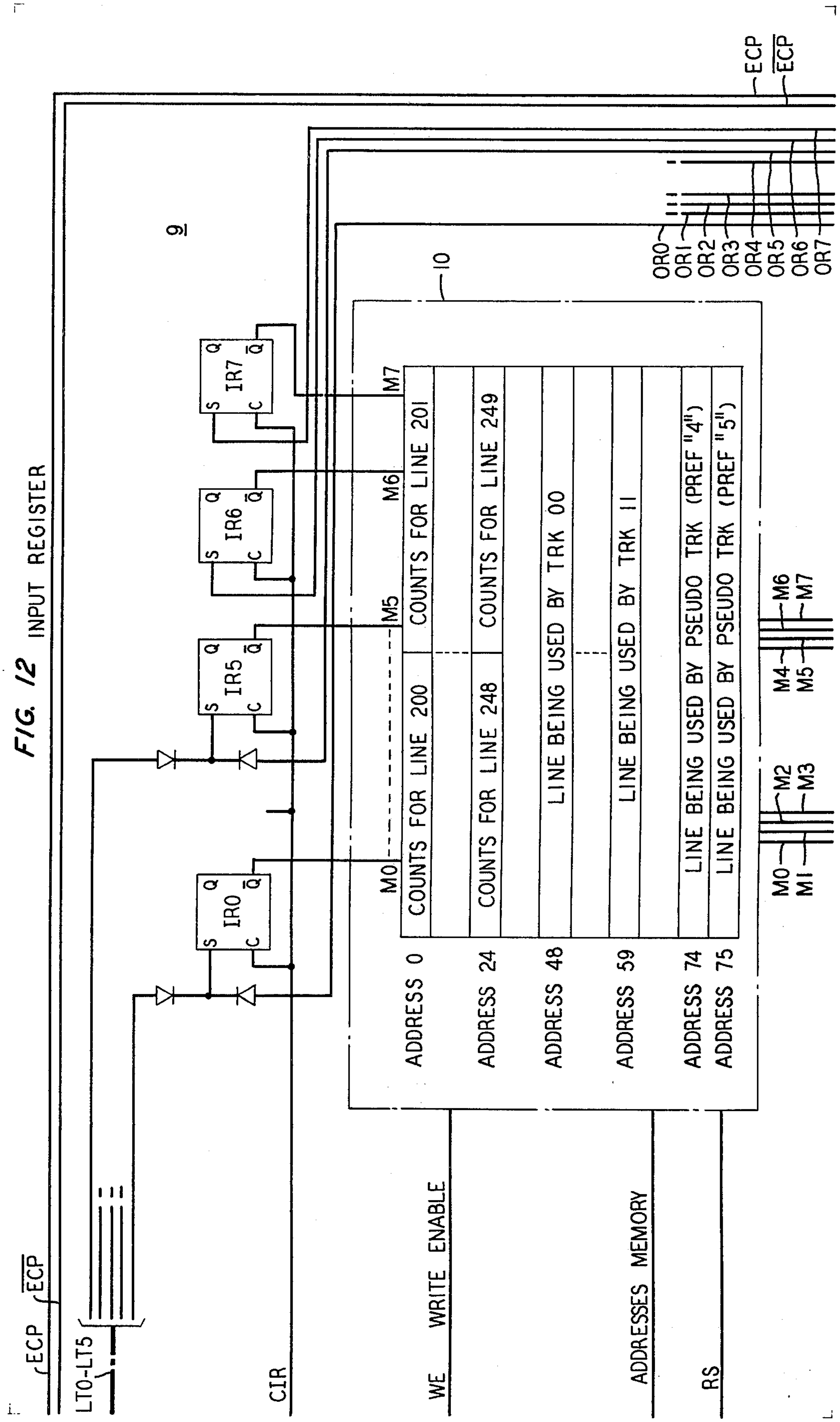
FIG. 12 shows the input register.
Figure 13:
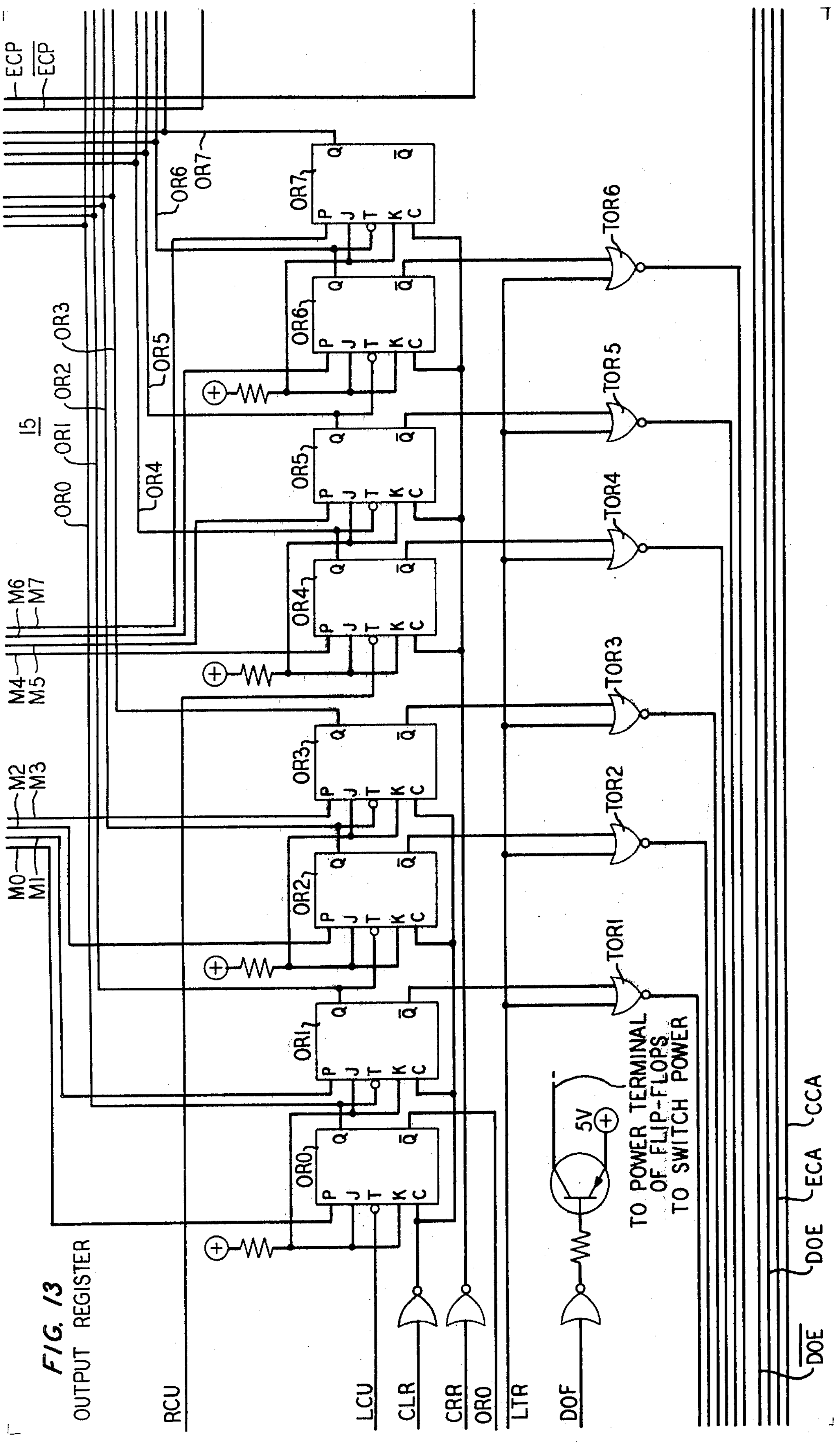
FIG. 13 shows the output register.

| Timing Gates, FIG. 10, 11 | Principal Function |
|---|---|
| TG1 | Enables gates CBR, CTR, flip-flops LTR and DOF for selectively clearing output register 15, FIG. 13, translator address register 11, FIG. 9, and resetting flip-flops LTR and DOF, FIG. 10. |
| TG2 | Generates the memory read strobe signal, RS. |
| TG3 | Sets the ICR flip-flop, FIG. 10 and enables the DOE flip-flop, FIG. 11, to be set. |
| TG4 | Enables gates CBR and CIR for selectively clearing output register 15 and input register 9. |
| TG5 | Sets the line number transfer flip-flop LTR to permit the line number in output register 15 to be entered into translator address register 11, FIG. 9. |
| TG6 | Re-enables the read memory strobe, RS. |
| TG7 | Generates ECA signal for display interface, FIG. 14. |
| TG8 | Enables gates ERCU and ELCU, FIG. 11 for selectively incrementing the message count when it is stored in output register 15. |
| TG9 | Clears the input register 9, FIG. 12. |
| TG10 | Generates the write enable signal WE and clears flip-flop DOE. |
| TG11 | Generates the end-of-cycle signal EOC and clears flip-flops ICR, COF and CSL. |

Summarizing the foregoing operations, the appearance of the NETINH signal incident to the seizure of an outgoing trunk 2 by calling one of station lines 4 has resulted in the stopping of the RCC clock of FIG. 7 and when the timing and control circuit of FIGS. 7, 10, and 11 generates the end-of-cycle signal, a write enable signal is generated to write the station line number of the calling station into a location in memory unit 10, FIG. 12, the address of which is determined by translating the number of the one of trunks 2 that has been seized for use on the call. After the calling station number is entered in memory unit 10, the RCC clock is restarted. This causes the normal scanning of the flip-flops SD1 through SD32 of the message counter detector 13, FIGS. 4 and 5 to be resumed.

Message count detector circuit 13 shown in FIGS. 4 and 5 includes a plurality of flip-flops SD1 through SD32 there being one such flip-flop for each of outgoing trunks 2. In addition, there is a flip-flop SD33 associated with the fictitious trunk number for nondestructive display of station line charge information and a flip-flop SD34 associated with the fictitious trunk number for the display and clearing of station line charge information.

Figure 3:
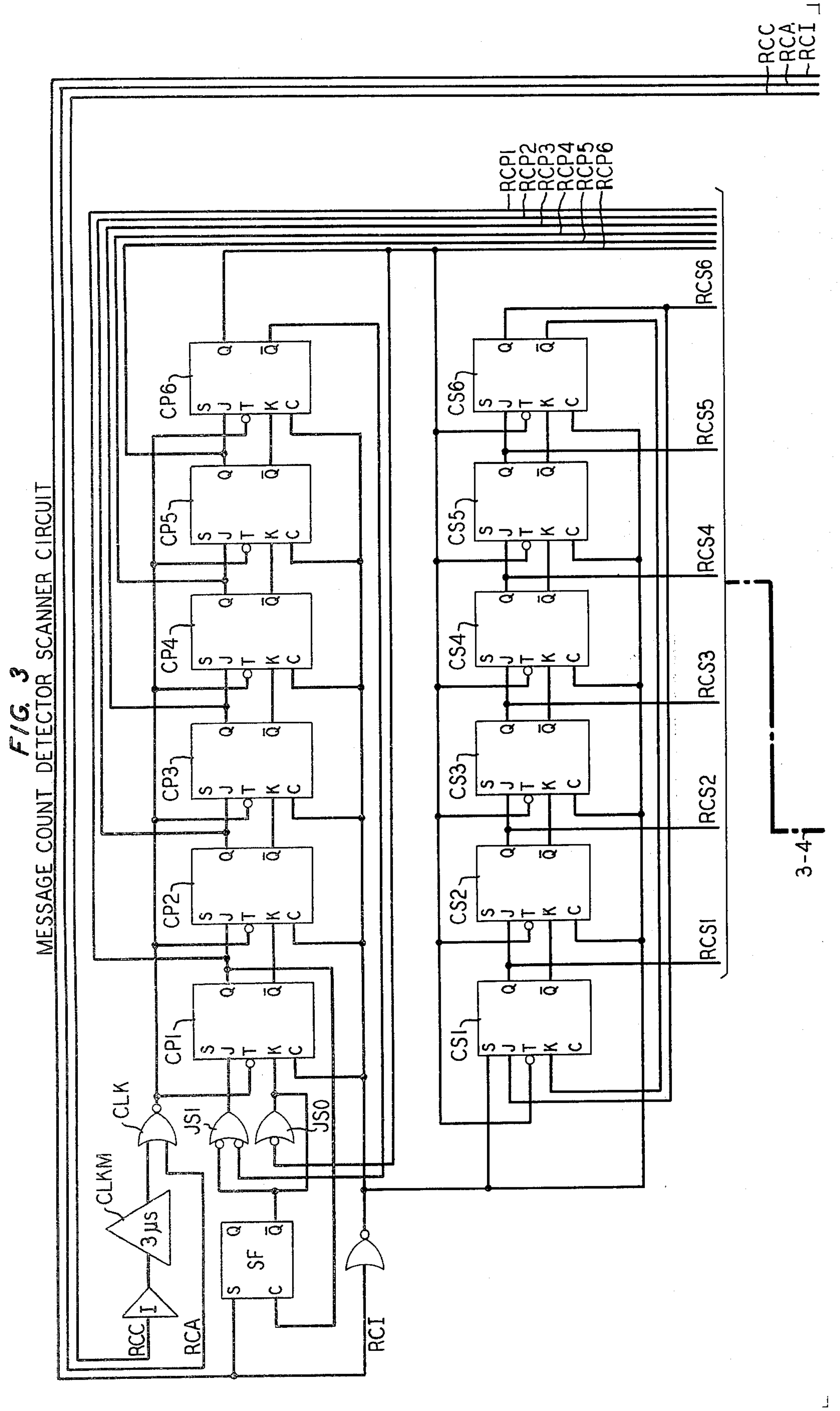
FIG. 3 shows the message count detector scanner circuit.

The flip-flops of the message count detector circuit are sequentiially interrogated under control of the message count detector scanner circuit FIG. 3. The message count detector scanner includes a first group of JK flip-flops CP1 through CP6 and a second group of JK flip-flops CS1 through CS6. The flip-flops are initialized by the appearance of a high signal on lead RCI which is inverted and applied as a low signal to the clear inputs of each of the flip-flops. The signal on lead RCI is devloped at the output of gate RCI in FIG. 8 in the manner hereinafter to be described.

Each of flip-flops SD1 through SD32 (of which only flip-flops SD1, SD5, SD6, and SD8 are shown explicitly) has a set input S associated with a respective lead TS1 through TS32 connected to its respective one of trunk circuits 2. In the trunk circuit, one of the conventionally provided relays (not shown) responds to the application of message register scoring potential when it is applied to the respective trunk by the remote central office 3. The manner in which the message register scoring potential is applied and detected in a conventional trunk circuit being well known is not detailed in the drawing. When the aforementioned relay responds, it applies battery potential to its respective one of leads TS1 through TS32 and sets the associated one of flip-flops SD1 through SD32. The state of the flip-flops of message count detector 13 is caused to be read out by the message count detector scanner of FIG. 3 which applies over cable 3–4 a signal to clear the flip-flops SD1 through SD32 in succession.

In the initial state, the output of flip-flop CS1 of FIG. 3 applies a high signal to lead RCS1 of cable 3–4 and low signals to all of the other output leads RCS2 through RCS6 and RCP1 through RCP6. When the first clock pulse appears on lead RCC, after the restarting of the RCC clock, flip-flops CP1 through CP6 are toggled. Flip-flop SF having been set by the high initializing signal on lead RCI applies at its $\overline{Q}$ output a low signal to the K input of flip-flop CP1 and to the upper input of NOR gate JS1. Since the lower input of NOR gate JS1 is also in the low signal state (connected to the $\overline{Q}$ output of reset flip-flop CP6), NOR gate JS1 applies a high signal to the J input of flip-flop CP1 setting the flip-flop. (The condition of a JK flip-flop such as flip-flops CP1 through CP6 and CS1 through CS6 is such that when toggled, the high signal on the J input sets the flip-flop causing its Q output to go high.)

The status of flip-flops CP1 through CP6 and CS1 through CS6 as revealed by the presence of high and low signals on leads RCS1 through RCS6 and RCP1 through RCP6 is applied to respective pairs of inputs to gates SG1 through SG32 associated with the clear inputs of flip-flops SD1 through SD32. Each of gates SD1 through SD32 is associated with a particular one of leads RCS1 through RCS6 and a particular one of leads RCP1 through RCP6 such that as the state of the count progresses through the flip-flops of FIG. 3, one and only one of NAND gates SD1 and SD32 is energized to clear a respective one of flip-flops SD1 through SD32.

With each subsequent clock pulse on lead RCC, a successive one of flip-flops SD1 through SD32 is scanned. When a flip-flop is reached that had been set, the flip-flop will be reset causing a transition signal to occur at its Q output. The transition signal is from the high signal state to the low signal state.

The flip-flops SD1 through SD32 are arranged in three groups of eight and one group of ten which includes flip-flops SD33 and SD34. Each of the flip-flops is associated with a respective one of message count detector output leads MR1 through MR4. Each of leads MR1 through MR4 is driven by a respective output gate transistor such as transistor MCD shown for the group of message count detector flip-flops SD1 through SD8. Transistor MCD has a base bias resistor MCBR and a base bias diode MCDD. The base bias diode MCDD is normally kept forward biased by the positive battery connected to resistor MCBR. The potential drop in resistor MCBR is normally not sufficient to turn off transistor MCD. When, however, one of the flip-flops in the group of flip-flops such as flip-flops SD1 through SD8 associated with transistor MCD is reset, the negative transition at the Q output of the flip-flop being reset drags the right-hand plate of the respective coupling capacitor below ground and greatly increases the current through the base bias resistor MCBR of transistor MCD causing the transistor to be turned off.

The potential of its collector approaches that of the collector battery and a high signal is applied to lead MR1. In similar fashion, the scanning of one of the flip-flops associated with each of message count detector leads MR2 through MR4 will result in a high signal appearing on one of these leads when an associated flip-flop is reset.

The high signal appearing on any one of leads MR1 through MR4 causes NOR gate MCD to devleop a low signal at its output which low signal stops the RCC clock in similar fashion to that described above when a high signal appeared on lead TRE incident to the initial seizure of an outgoing trunk. However, this time, lead TRE does not go high and so that major state clock MSG of FIG. 7 is not stopped.

Figure 8:
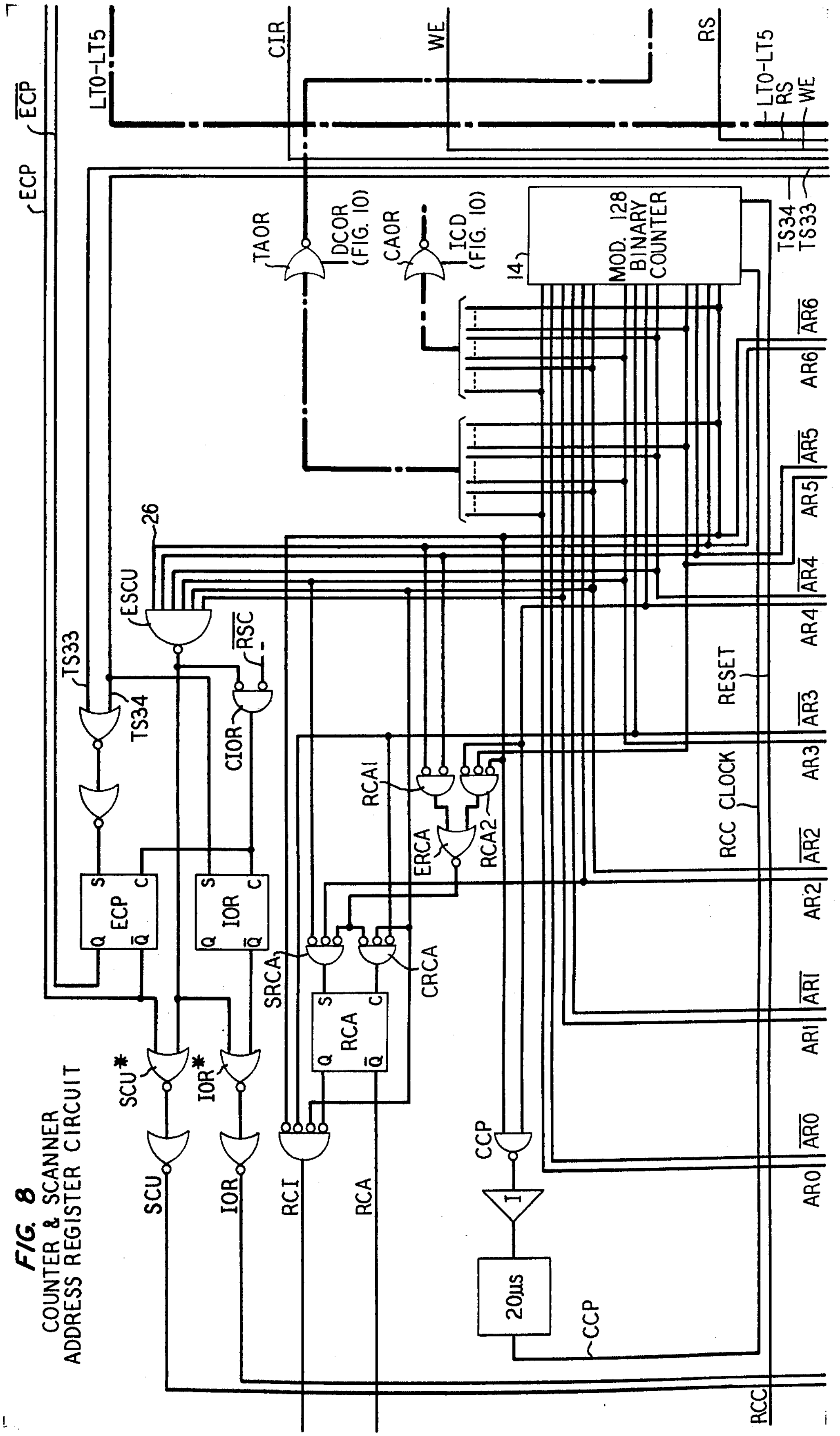
FIG. 8 shows the counter and pseudo trunk address detector circuit.

At the same time that the message count detector scanning circuit of FIG. 3 was responding to the RCC clock pulses on lead RCC, the Mod. 128 binary counter of FIG. 8 was also responding to the clock pulses. For each clock pulse of these clock pulses, the counter incremented its count to that of a different address in memory unit 10. Each of these addresses is the location of a memory word assigned to one of trunks 2. When the RCC clock is stopped as just described, the Mod. 128 binary counter also stops and its output identifies the address of the memory word in memory unit 10 assigned to the trunk whose message count detector flip-flop SD1 through SD32 was reset by the scanner of FIG. 3.

As the major state clock continues the count, memory output register 15 of FIG. 13 is cleared by the energization of gate CLR in FIG. 10 under the control of the major state clock MSG of FIG. 7. Referring to FIG. 10 it is seen that gate CLR is enabled by the output of gate CBR which in turn may be enabled by the output of gate TG1. On a subsequent count of the major state generator clock MSG of FIG. 7, gate RS of FIG. 10 is enabled to read the contents of the addressed memory unit 10 into the output register 15 of FIG. 13. Output register 15 includes the eight JK flip-flops OR0 through OR7. When the $\bar{Q}$ output of the least-significant (left-most) one of flip-flops OR0 through OR7 is in the low signal state, the number recorded in output register 15 is considered to be an odd number. The signal appearing at this $\bar{Q}$ output is applied to the lower input of NOR gate DOEG shown in the lower right-hand portion of FIG. 11. The major state generator clock MSG of FIG. 7 continues counting and in due course when gate TG3 in FIG. 10 is activated, will apply a low signal to the upper input of NOR gate DOEG. At this time, the output of NOR gate DOEG goes high setting flip-flop DOE. The setting of flip-flop DOE indicates that the memory word contents entered into output register 15 is the number of a station line assigned an odd number in PBX 1. At a subsequent time, the contents of output register 15 will be replaced by the message unit or other billing data count that has been accrued for that line. Flip-flop DOE remains set and remembers whether the line was even or odd numbered so that the status count information may be taken from either the left half or right half byte of the memory word which stores the message count data, etc., as will now be explained more fully.

In FIG. 11, gate ERCU will be enabled to develop a high output signal when the low signal at the $\bar{Q}$ output of flip-flop DOE is accompanied by a low signal applied to the lower input of gate ERCU during that count of the major state generator MSG that enables timing gate TG8 to apply via an inverter a low signal to the lower input of gate ERCU. The high output signal then developed by gate ERCU partially enables NAND gate RCUG. Gate RCUG will be fully enabled when a high signal is applied on lead SCU by the circuitry of FIG. 8. When gate RCUG is so enabled, it applies a low signal to trigger a 10 microsecond monopulser RCUM. Monopulser RCUM applies a 10 microsecond long signal on lead RCU. The signal on lead RCU is applied to the right-hand bank of flip-flops comprising output register 15, FIG. 13, toggling flip-flops OR4 through OR7. Toggling the right-hand bank of flip-flops causes the binary count accuring therein to be incremented by the binary counter 1. On the other hand, had the line number entered into the output register 15 been an even number this would have been "remembered" by the reset state of flip-flop DOE, FIG. 11, in which case monopulser LCUM would have been enabled via gates ELCU and LCUG. Monopulser LCUM when so enabled would apply a 10 microsecond long pulse to lead LCU to toggle the left-hand bank of flip-flops OR0 through OR3 of output register 15 increasing the message count accruing therein by 1. Major state generator MSG next energizes timing gate TG9 which in turn energizes gate CIR to clear the memory input register 9 of FIG. 12. Major state generator MSG next energizes timing gate TG10 which activates the write enable gate WE so that the contents of flip-flops OR0 through OR7 constituting output register 15 may be rewritten into the memory word of memory unit 10 from which they were read out. The reading out of a line number into output register 15 will direct the subsequently obtained message count information to either the left or right-hand bank of four flip-flops in output register 15. The count accruing in that bank of flip-flops is then updated, read out of registers 15 and the contents of registers 15 returned to memory via the input register of FIG. 12. The contents of the output of the flip-flops OR0 through OR7 constituting output register 15 are entered into memory unit 10 when the write enable lead WE is energized by the output of timing gate

TG10, FIG. 10.

Figure 6:
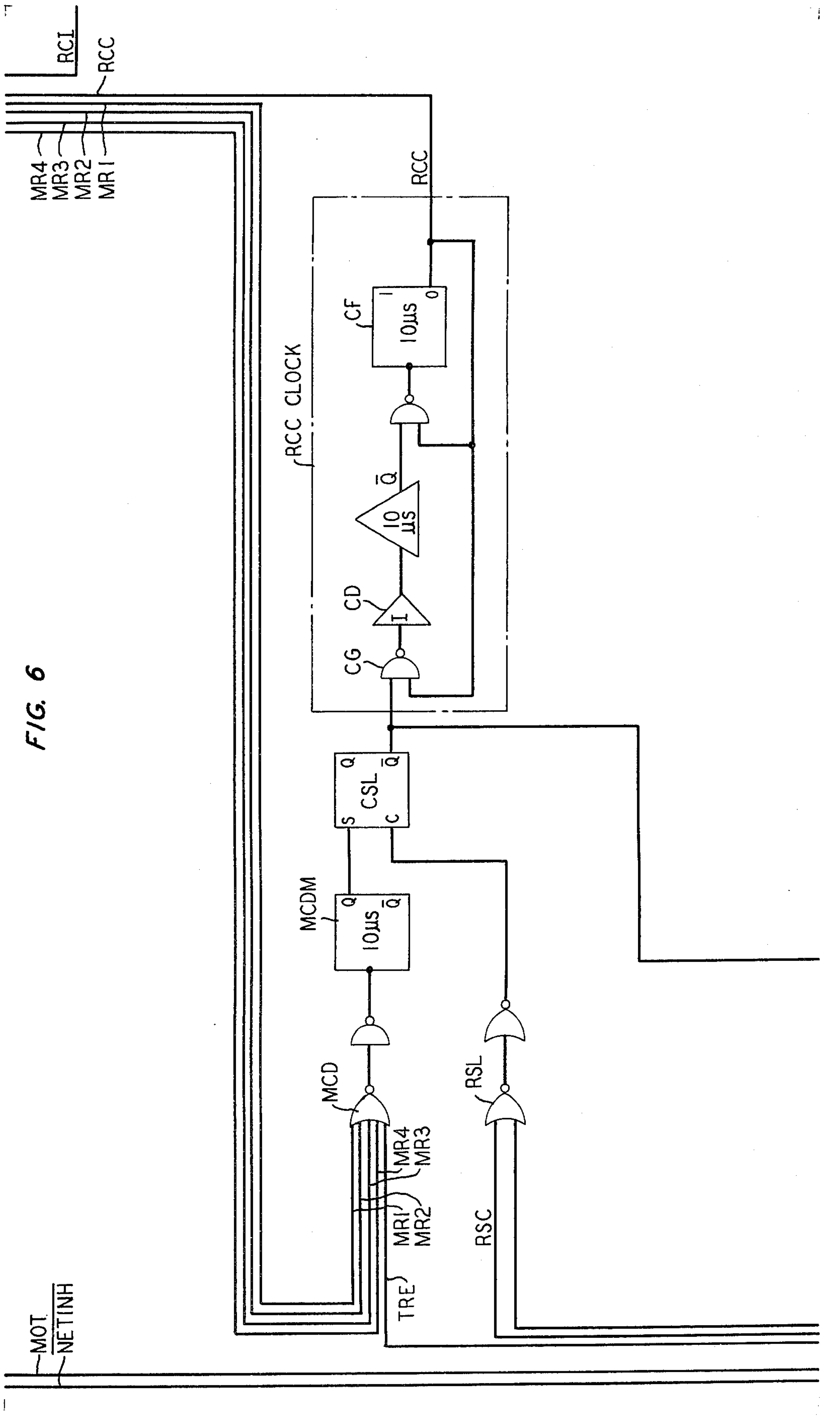
FIG. 6 shows the scanner and counter clock circuitry.

With the completion of the storage of the updated message count in the appropriate line word, major state generator MSG activates timing gate TG11 which generates the end-of-cycle signal EOC. At this point the scanning of message count detectors 13 may be resumed or a new line and trunk number may be furnished to translators 7 and 8 by PBX 1 incident to the seizure of a trunk by a line on a a new call. It should be noted that the entry of a new line number into the appropriate trunk word of memory 10 is handled by the illustrative circuitry on a higher priority basis than the resumption of the scanning of the message count detectors 13. If a new line number is not furnished by PBX 1 when lead EOC is energized, flip-flop CSL in FIG. 6 is cleared by the output of timing gate TG11 restarting the RCC clock.

ATTENDANT DISPLAY CALL

When the desk attendant at console 22, FIG. 4, desires to have displayed the accrued message count (or the dollar charges) for a particular line, the attendant dials the readout access code digit for either the display or the display-and-clearing of the station register, followed by the station number. The nondestructive and destructive readouts are distinguished by the assignment of a different prefix digit to the station number. Advantageously, the prefix digits identifying the destructive or nondestructive display call may be digits that are distinguishable from any initial digit assigned to a station number. Accordingly, the entry of either type prefix digit into PBX register 23 is readily detectable and results in the operation of either relay 23-4 or 23-5, contacts of which ground a distinctive pattern of leads to enter one of two fictitious trunk numbers into trunk number translator 8.

Assuming that the initial digit for nondestructive display is a 4, the one of the relays (not shown) of PBX register 23 that responds to the digit 4 will be operated and its work contact, ISS4, will complete an operating path for relay 23-4. Contacts 23-4C of relay 23-4 then apply a pattern of ground signals to the leads of cable 23-8 to enter a fictitious trunk number in trunk number translator 8 which number designates an address in memory 10 assigned for use on simple display access calls. On the other hand, when an initial digit 5 is registered in PBX register 23, as for a display-then-clear type of call, work contact ISS5 of the digit 5 registering relay will be operated to complete an operating path to relay 23-5. Contacts 23-5C of relay 23-5 enter a different fictitious trunk number into trunk number translator 8. Trunk number translator 8 translates the code pattern into the binary form acceptable to translator address register 11 of FIG. 9. The number in translator 8 is entered into the flip-flops TA0 through TA6 of the translator address register.

The remaining digits of the station line dialed from console 22 are also entered into PBX register 23. These digits are then transferred to line number translator 7 which converts them to a form suitable for acceptance by input register 9 of memory unit 10 of FIG. 12.

Incident to the entry of the line number and fictitious trunk number into registers 7, 8, PBX common control 5 energizes lead $\overline{NETINH}$ to stop the RCC clock and to reset flip-flops CC1 through CC3 driving the master state generator MSG 20 of FIG. 7 in the same manner as previously described for the case when an ordinary trunk call was being made.

As previously described, the RCC and MSG clocks are stopped when lead TRE is energized by the end-of-cycle (lead EOC energized) signal developed by the timing and control circuit, MSG 20 of FIG. 10 (gate EOC energized). The signal on lead TRE, inverted, sets the 1 millisecond monopulser TLM in FIG. 7 and the $\overline{Q}$ output of TLM then sets 15 microsecond monopulser WTCM. The Q output of monopulser WTCM applies a 15 microsecond signal to lead WTC which signal results in a low signal being delivered to write enable lead WE of memory unit 10. The signal on lead WE enables memory unit 10 to store the line number that has been inserted in its input register 9 to be stored in the memory location indicated by the address in translator address register 11, FIG. 9. Accordingly, the line number dialed by the attendant at console 22 is the memory location identified by the fictitious trunk number.

The inverted write enable signal $\overline{WE}$ also clears flip-flop CSL allowing the RCC clock to restart. Restarting of the RCC clock enables the message count detector scanner circuit of FIG. 3 to commence scanning message count detectors in the same manner as previously described for the case of an ordinary outgoing call.

At the same time that the fictitious trunk number was entered into the translator address register 11 of FIG. 9, NAND gate GTS of FIG. 9 detected the appearance of all but the least significant digits of the fictitious trunk number and partially enabled gates GTS3 and GTS4. Gate GTS3 will be fully enabled by the registration of an odd fictitious trunk number as indicated by the setting of flip-flop TA0 while gate GTS4 will be fully enabled by the registration of an even fictitious trunk number, as indicated by the reset state of flip-flop TA0. The enabling of gate GTS3 or GTS4 via a corresponding lead TS33 or TS34 sets either flip-flop SD33 or SD34 in FIG. 5 which flip-flops are identical to the flip-flops SD1 through SD32 associated with trunks 2. The setting of flip-flops SD33 or SD34 will then be detected by the energization of lead MR4 when the message count detectors 13 are scanned in the same manner that lead MR4 will be energized had one of the trunks associated with flip-flops SD27 through SD32 (not explicitly shown) associated with lead MR4 been set by its corresponding one of trunks 2.

The enabling of gate GTS3 or GTS4 also sets flip-flop ECP in FIG. 8. If gate GTS4 was enabled, flip-flop IOR in FIG. 8 will also be set. The state of these flip-flops will later be sensed during scanning when gate ESCU is enabled by Mod. 128 counter when it is stopped by the resetting of message count detector flip-flops SD33 or SD34.

When the RCC clock is restarted after the entry of the line number in the word assigned to the fictitious trunk, the scanning of message count detectors under the control of the scanner circuit of FIG. 3 resumes. Scanning will continue as previously described until the set one of flip-flops SD33 or SD34 is encountered. The resetting of the set one of these flip-flops causes a high signal to appear on lead MR4. The high signal on lead MR4 is applied to gate MCD, FIG. 6, which sets monopulser MCDM and that in turn sets flip-flop CSL. The setting of flip-flop CSL stops the RCC clock.

When the RCC clock is thus stopped, it stops the Mod. 128 binary counter 14 of FIG. 8 at the memory address corresponding to the fictitious trunk number associated with the set one of flip-flops SD33 or SD34, FIG. 5. The incrementation of counter 14 to the address of either fictitious trunk is detected by NAND gate ESCU, FIG. 8, which enables NOR gates IOR* and SCU* to respond to the $\bar{Q}$ outputs of flip-flops ECP and IOR. Since flip-flop ECP had priorly been set when the display access call was registered, a low signal is present at the upper input of NOR gate SCU*. With low signals presented at both its inputs, NOR gate SCU* applies a high signal to inverter SCU which maintains lead SCU low. This low signal causes both gates RCUG and LCUG, FIG. 11, to be disabled, thereby preventing output register 15, FIG. 13 from later being incremented when it receives message count data from memory unit 10, (on TG6). If flip-flop IOR had priorly been set by the registration of a destructive display access call, a low signal will be applied to lead IOR and this will later enable gate CBR to clear both halves of output register 15, FIG. 13 of the memory count data received from memory unit 10.

Major state generator MSG of FIG. 7 will next activate timing gate TG2 to activate read strobe lead RS to the memory unit 10, FIG. 12. The memory word stored in the fictitious trunk number location will be read out into output register 15 of FIG. 13. This memory word is the line number that was dialed by the desk attendant during the registration of the display call. After the line number is entered into output register 15 it is transferred to the translator address register of FIG. 9 when the master clock MSG 20 activates timing gate TG5, FIG. 10, to set flip-flop LTR. Flip-flop LTR in the set state energizes lead LTR to enable the output gates TOR1 through TOR6, FIG. 13, which connected the $\bar{Q}$ outputs of flip-flops OR1 through OR6 to the flip-flops TA0 through TA5 of translator address register 11, FIG. 9. The number of the station line that had been dialed by the attendant is now stored in translator address register 11 and, accordingly, memory unit 10 is now accessed to obtain the contents of the memory word assigned to that station line.

Master state generator MSG next energizes timing gate TG6 which in turn energizes the read strobe lead RS causing memory unit 10 to deliver the contents of the word assigned to the station line into output register 15 of FIG. 13. The memory word assigned to the line advantageously may contain either a simple message count or an indication of the dollar charges which have accrued on the line. In the illustrative embodiment, it is assumed that the word contains a simple message count.

Flip-flop ECP of FIG. 8 was set when the message count detector flip-flop SD33 or SD34 was scanned. The Q output of flip-flop ECP maintains a high signal on lead $\overline{ECP}$ causing NOR gate SDC in FIG. 14 to deliver a low signal to gate SDC* which in turn applies a high signal to the leftmost inputs of gates DAL, DAR, DBL, DBR, DCL, DCR, DDL and DDR.

Flip-flop DOE, FIG. 11, was set or allowed to remain reset during the activation of timing gate TG3 depending upon whether or not the station line being used by the fictitious trunk was an odd numbered or an even numbered line, respectively. If flip-flop DOE was set, its Q output maintains a high signal on gates DAR, DBR, DCR, and DDR. If flip-flop DOE was reset, its $\bar{Q}$ output maintains a high signal on gates DAL, DBL, DCL and DDL so that either the left or right half of the message count bits of the addressed word in memory unit 10 will be entered into flip-flops DA, DB, DC, and DD. The message count information entered into flip-flops DA through DD is assumed to be in binary form. This information is converted to BCD form by a conventional BCD converter 14BCD and further converted by a conventional seven-segment format converter 14SS into the format required for a conventional seven-segment type of light emitting diode display LSD. The seven-segment display drivers 14SS1 and 14SS2 are enabled by the $\bar{q}$ output of 15-second monopulser 15S so that the display will remain for 15 seconds. Monopulser 15S is enabled by flip-flop DTF receiving a clear signal at the same time that the message count detector flip-flop SD33, FIG. 5, was cleared by the scanner of FIG. 3.

Reference is made to application Ser. No. 486,003 of H. P. Anderson and C. C. Nielson, filed on even date herewith, wherein a related invention is disclosed and claimed.

What is claimed is:

1. An arrangement for recording in an electronic memory unit the charges for calls made from the statio lines of a common control PBX in which the remote central office returns message charging signals over the trunks to the PBX, the combination comprising means for furnishing from said common control of said PBX the number of a station line and trunk employed on a call, means associated with said trunks for detecting the arrival of one of said message charging signals, means responsive to the dialing of a station line number accompanied by a predetermined access code for generating a pseudo trunk number.

means alternatively controllable by said common control furnishing means and said pseudo trunk number generating means for allocating a respective storage word in said electronic memory, means responsive to the furnishing of one of said station or one of said accompanied station numbers for storing said respective station number in said allocated storage word, means controlled by said detecting means for reading the contents of the associated one of said memory words, display means, and means responsive to the dialing of said predetermined access code for selectively connecting said memory unit to said display means.

2. An arrangement according to claim 1 including means responsive to the reading of the contents of said associated one of said memory words for accessing an indicated byte in said electronic memory unit, and means normally operative upon the accessing of said byte for incrementing the contents thereof.

3. An arrangement according to claim 2 further comprising means responsive to the appearance of said pseudo trunk number for inhibiting said normally operative incrementing means.

4. An arrangement according to claim 3, wherein said means for reading said contents of said associated one of said memory words includes means for selectively controlling said accessing of said byte in accordance with whether said contents is an even or odd number station line.

5. A message charge recording and display applique arrangement for a common control PBX having a plurality of station lines and trunks, comprising a plurality of flip-flop means associated with said trunks and respectively settable upon the receipt of a central office message charging signal, an electronic memory means having a storage word for each of said trunks and a storage byte for each of said station lines, scanning means for normally scanning said flip-flop means, counter means normally operative in step with said scanning means for indicating successive addresses in said memory means, means for reading the contents of a memory word addressed by said counter means when said scanner means detects a set one of said flip-flops, means for readdressing said memory means in accordance with the contents of said counter-addressed memory word, means for normally incrementing the contents of the memory word addressed by said readdressing means, display means, and means responsive to the addressing of a predetermined memory word by said counter means for inhibiting said incrementing and for connecting said display means to said memory unit.

6. An arranagement according to claim 5 further comprising means connected to said PBX common control for registering the number of a station line and the number of the trunk assigned thereto by said PBX, and means for writing said line number in said storage word of said electronic memory allocated to said trunk number registered in said registering means.

7. An arrangement according to claim 6 wherein said means for readdressing includes first means for determining whether the contents of said counter-addressed memory word is the number of an even or odd numbered station line and wherein said normally incrementing means includes means controlled by said first means for selectively incrementing a particular byte of said memory word addressed by said addressing means.

8. An arrangement according to claim 7 wherein said means responsive to the addressing of said predetermined memory word by said counter means includes means for connecting said display means to said memory unit to display means to said memory unit to display the contents of said counter-addressed memory word, and means for connecting said memory unit to said display means to display the contents of said particular byte.

9. An arrangement according to claim 6 further comprising means connected to said PBX common control for detecting the occurrence of a predetermined dialed prefix digit accompanied by the number of one of said station lines for entering said dialed line number and a pseudo trunk number in said registering means.

10. A message charge recording and display applique arrangement for a common control PBX having a plurality of station lines and trunks comprising an electronic memory means having a storage word for each of said trunks and a storage byte for each of said station lines, scanning means for normally scanning said trunks to detect the receipt of a central office message charging signal by one of said trunks, means connected to said common control for registering the number of a station line and the number of said one of said trunks assigned thereto by said PBX, means for writing said line number registered in said registering means in a work of said electronic memory allocated to said trunk number registered in said registering means, means controlled by said scanning means for reading said memory word alocated to said trunk number, means for incrementing said storage byte allocated to said line number read from said memory, and means connected to said common control unit and responsive to the dialing of a predetermined code for entering a pseudo trunk number in said registering means.

11. An arrangement according to claim 10 further comprising flip-flop means scannable by said scanning means and means responsive to the dialing of said predetermined code for setting one of said flip-flop means.

12. An arrangement according to claim 11 wherein said scanning means includes counter means for indicating successive addresses in said memory means, and means connected to said counter means and responsive to a predetermined address count for inhibiting said incrementing means.

13. An arrangement according to claim 12 further comprising display means and wherein said means responsive to the dialing of said pseudo trunk number includes means for connecting said electronic memory means to said display means.

14. A message charge recording arrangement for a common control PBX having a plurality of station lines and trunks comprising an electronic memory means having a storage word for each of said trunks and a storage byte for each of said station lines, means for entering the number of a calling line in the storage word of said memory means allocated to the one of said trunks seized for use by said line, means for accessing the storage byte allocated to said line for normally incrementing the message count accruing therein, means under control of an attendant for furnishing a fictitious trunk number to said entering means to enter an attendant-designated line number in a further one of said storage words, and means subsequently operable for recontrolling said accessing means to access the storage byte allocated to said line number stored in said further one of said storage words without incrementing said message count accruing therein.

15. A message charge recording arrangement according to claim 14 further comprising display means, and means under control of said subsequently operable means for displaying said designated line number and said message count accruing in said storage byte.

* * * * *

UNITED STATES PATENT AND TRADEMARK OFFICE

CERTIFICATE OF CORRECTION

PATENT NO. : 3,920,911

DATED : November 18, 1975

INVENTOR(S) : Frederic Lukas

It is certified that error appears in the above-identified patent and that said Letters Patent are hereby corrected as shown below:

Column 1, line 39, "ferreed" should read --memory--;

line 53, "inventiion" should read --invention--.

Column 2, line 18, "accordancae" should read --accordance--.

Column 4, line 32, "messagae" should read --message--.

Column 5, line 56, "Q" should read --$\overline{Q}$--.

Column 6, line 60, "TRG 1" should read --TG1--.

Column 11, line 9, "on a a new" should read --on a new--.

Signed and Sealed this

*first* Day of *June 1976*

[SEAL]

*Attest:*

RUTH C. MASON
*Attesting Officer*

C. MARSHALL DANN
*Commissioner of Patents and Trademarks*